United States Patent
Babin

[11] Patent Number: 6,162,044
[45] Date of Patent: Dec. 19, 2000

[54] MULTI-CAVITY INJECTION MOLDING APPARATUS SPLITTING MELT NEAR NOZZLE FRONT

[75] Inventor: Denis L. Babin, Acton, Canada

[73] Assignee: Mold-Masters Limited, Georgetown, Canada

[21] Appl. No.: 09/285,179

[22] Filed: Mar. 23, 1999

[30] Foreign Application Priority Data

Feb. 26, 1999 [CA] Canada .................................. 2264224

[51] Int. Cl.[7] .................................................. B29C 45/22
[52] U.S. Cl. .......................................... 425/562; 425/564
[58] Field of Search .................................. 425/562, 563, 425/564, 565, 566, 549; 264/328.8

[56] References Cited

U.S. PATENT DOCUMENTS

| | | | |
|---|---|---|---|
| 2,770,011 | 11/1956 | Kelly | 425/563 |
| 3,530,539 | 9/1970 | Gellert | 425/547 |
| 3,806,295 | 4/1974 | Gellert | 425/245 R |
| 4,378,963 | 4/1983 | Schouenberg . | |
| 4,424,622 | 1/1984 | Krause | 29/611 |
| 5,078,589 | 1/1992 | Osuna-Diaz | 425/562 |
| 5,094,603 | 3/1992 | Gellert | 425/130 |
| 5,268,184 | 12/1993 | Gellert | 425/190 |
| 5,269,676 | 12/1993 | Gellert | 425/549 |
| 5,368,470 | 11/1994 | Manner | 425/564 |
| 5,372,496 | 12/1994 | Taniyama | 425/556 |
| 5,609,893 | 3/1997 | Eastwood | 425/549 |
| 5,641,526 | 6/1997 | Gellert | 425/549 |
| 5,645,874 | 7/1997 | Osuna-Diaz | 425/549 |
| 5,952,016 | 9/1999 | Gellert | 425/190 |

FOREIGN PATENT DOCUMENTS 2613173  9/1977  Germany .
3733363  4/1989  Germany .

*Primary Examiner*—Tim Heitbrink
*Assistant Examiner*—Emmanuel S. Luk
*Attorney, Agent, or Firm*—Dalesman & Company

[57] ABSTRACT

Valve gated injection molding apparatus having several valve pins (62) extending through each heated nozzle (12) driven by a common actuating mechanism (70). A valve bushing (100) is seated in the front end (96) of each heated nozzle (12). A central melt bore (50) in each heated nozzle (12) splits in the valve bushing (100) near the front end of the heated nozzle (12) from where the melt flows around each of the valve pins (62) to the gates (66).

7 Claims, 3 Drawing Sheets

MULTI-CAVITY INJECTION MOLDING APPARATUS SPLITTING MELT NEAR NOZZLE FRONT

BACKGROUND OF THE INVENTION

This invention relates generally to hot runner injection molding and more particularly to valve gated injection molding apparatus wherein each heated nozzle has a number of valve pins extending therethrough and a central melt bore in which the melt splits near the front end of the nozzle to flow through removable nozzle inserts aligned with the gates.

As seen in U.S. Pat. No. 5,094,603 to Gellert which issued Mar. 10, 1992, it is known to split an injection hot runner at or near the rear end of a heated nozzle. Another example is shown in U.S. Pat. No. 5,368,470 to Manner which issued Nov. 29, 1994 wherein several valve pins are driven by a common piston drive. However, having the hot runner split near the rear end of the heated nozzle has the disadvantage that the split runners extending through the nozzle are smaller which produces more stress in the melt.

DE 37 33 363 shows a hot runner which splits closer to the front end of the nozzle, but it has the disadvantage that there are no individual nozzle inserts that can be made of a more suitable material and are removable for cleaning or replacement if the need arises.

SUMMARY OF THE INVENTION

Accordingly, it is an object of the present invention to at least partially overcome the disadvantages of the prior art by providing valve gated injection molding apparatus wherein the melt bore splits in a valve bushing near the front end of the heated nozzle to flow through removable nozzle inserts aligned with the gates.

To this end, in one of its aspects, the invention provides a multi-cavity valve gated injection molding apparatus having one or more heated nozzles extending forwardly into a well in a cooled mold with an insulative air space extending between each heated nozzle and the surrounding cooled mold. Each heated nozzle has a rear end, a front end and a plurality of equally spaced valve pin bores extending therethrough from the rear end to the front end. A corresponding plurality of elongated valve pins are each received in one of the valve pin bores through the heated nozzle. A valve pin actuating mechanism is connected to the valve pins to simultaneously reciprocate the valve pins between an open position and a closed position. Each heated nozzle has a melt bore extending therethrough from a central inlet at the rear end. A valve bushing is seated in a recessed seat in the front end of each heated nozzle. The valve bushing has a rear end, a front end, several equally spaced valve pin bores extending therethrough from the rear end to the front end in alignment with the valve pin bores through the heated nozzle, and a melt bore extending therethrough from the rear end to the front end. The melt bore has several front portions and a central rear portion extending from the rear end in alignment with the melt bore through the heated nozzle. Each front portion extends from the central rear portion diagonally outwardly to join one of the valve pin bores adjacent the front end of the valve bushing. A retaining ring is seated in the recessed seat in the front end of the heated nozzle adjacent the front end of the valve bushing. The retaining ring has a rear end, a front end and several openings extending therethrough from the rear end to the front end. Each opening extends in alignment with one of the valve pin bores through the valve bushing. Several elongated hollow nozzle inserts are retainably seated in the openings through the retaining ring, each having a front portion extending forwardly from the retaining ring in alignment with a gate leading to a cavity. Each nozzle insert has a rear end, a front end, and a central opening extending therethrough from the rear end to the front end to receive one of the valve pins therein. A space extends around the valve pin to convey melt from one of the diagonal front portions of the melt bore through the valve bushing to the aligned gate. A nozzle seal removably mounted at the front end of the heated nozzle bridges the insulative air space between the heated nozzle and the cooled mold, locates the front end of the heated nozzle, and retains the bushing seal, the retaining ring, and the nozzle inserts in place.

Further objects and advantages of the invention will appear from the following description taken together with the accompanying drawings.

DETAILED DESCRIPTION OF THE INVENTION

Figure 1:
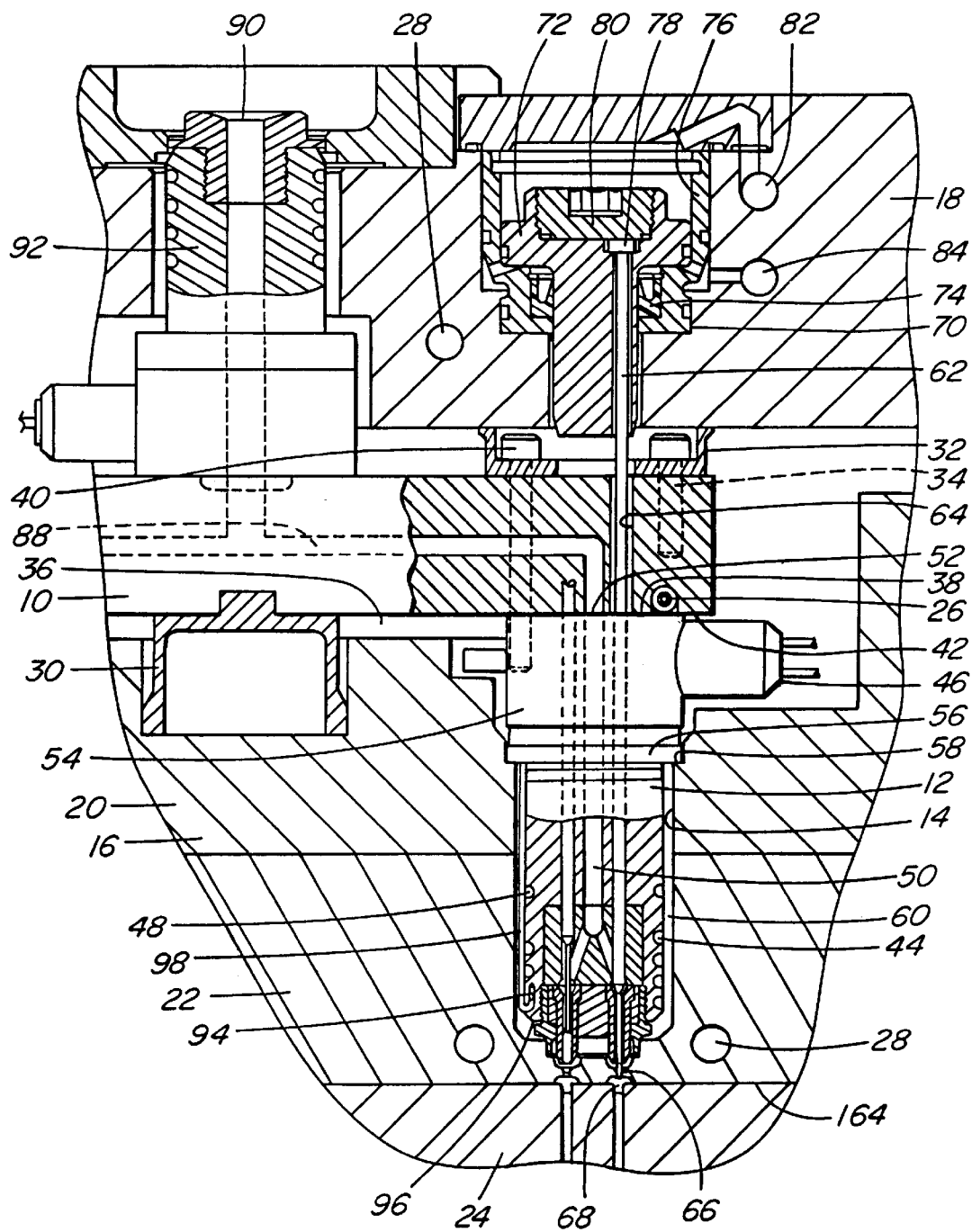
FIG. 1 is a sectional view of a portion of a multi-cavity valve gated injection molding system or apparatus having heated nozzles according to a preferred embodiment of the invention.
Figure 2:
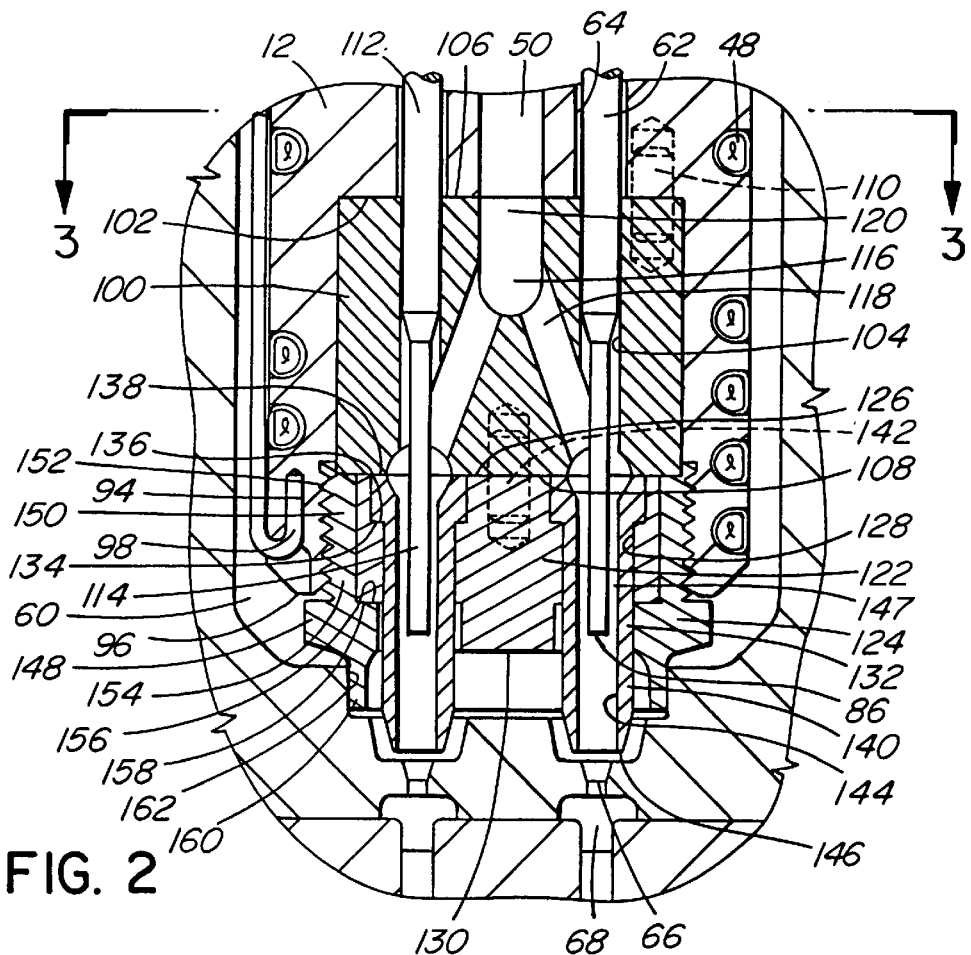
FIG. 2 is an enlarged sectional view of a portion of FIG. 1.
Figure 3:
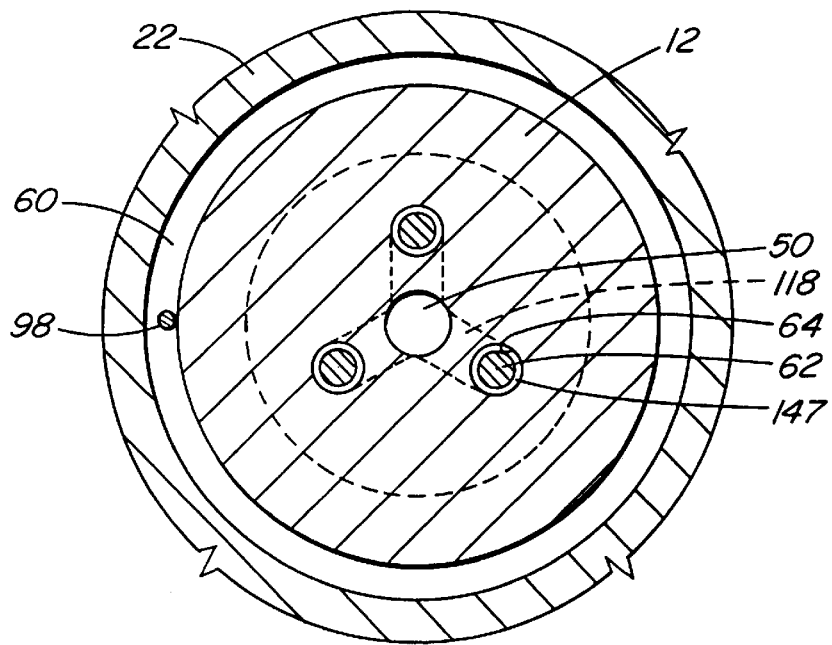
FIG. 3 is a sectional view along line 3—3 in FIG. 2.
Figure 4:
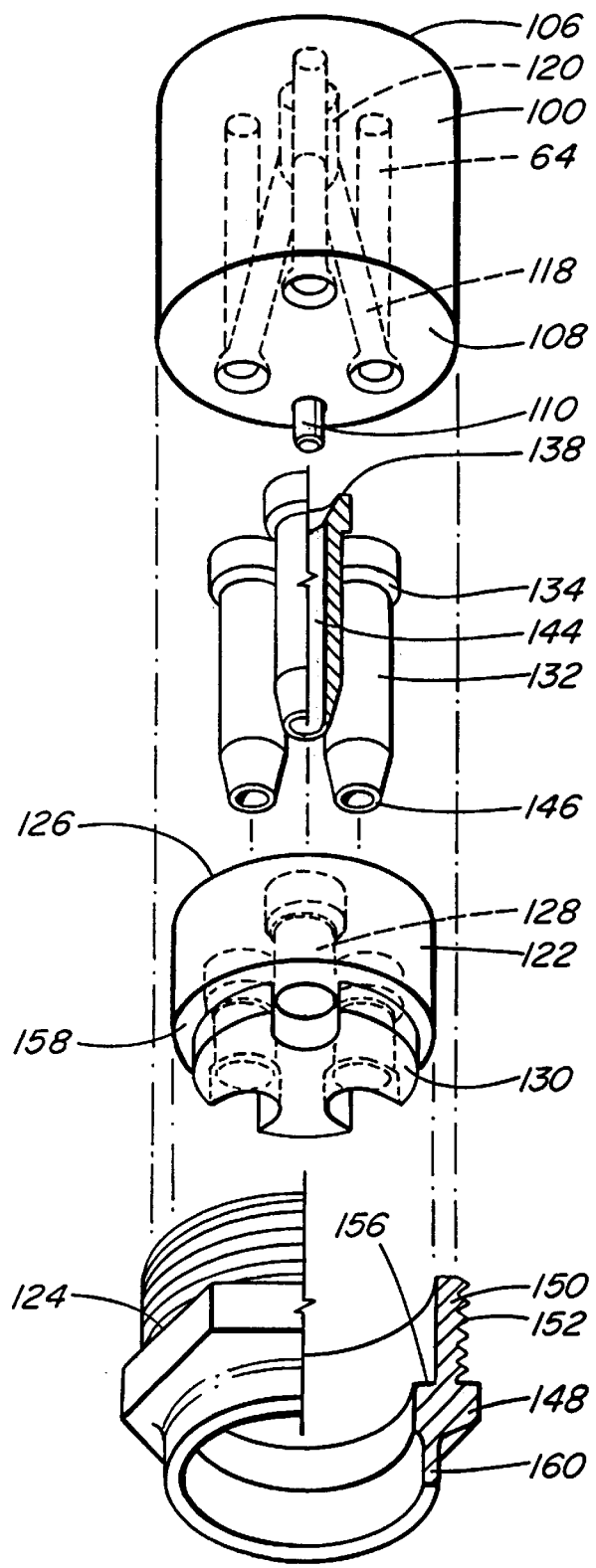
FIG. 4 is an exploded isometric view showing a valve bushing, retaining ring, heated nozzles and a nozzle seal ready to be mounted in the front end of a heated nozzle.

Reference is first made to FIGS. 1–3 which show a portion of a multi-cavity valve gated injection molding system or apparatus having a melt distribution manifold 10 interconnecting several heated nozzles 12. Each nozzle 12 is seated in a well 14 in a mold 16. While the mold 16 usually has a greater number of plates depending upon the application, in this case, only a back plate 18, a manifold plate 20, a cavity plate 22 and a core plate 24 are shown for ease of illustration. The melt distribution manifold 10 is heated by an integral electrical heating element 26 and the mold 16 is cooled by pumping cooling water through cooling conduits 28. The melt distribution manifold 10 is mounted between the manifold plate 20 and the back plate 18 by a central locating ring 30 and a number of insulative spacers 32 attached to the melt distribution manifold 10 by screws 34 to provide an insulative air space 36 between the heated manifold 10 and the surrounding cooled mold 16.

The rear end 38 of each nozzle 12 is secured by screws 40 against the front face 42 of the melt distribution manifold 10. Each nozzle 12 has an integral electrical heating element 44 with a terminal 46 and a helical portion 48 extending around a melt bore 50 extending through the heated nozzle 12 from a central inlet 52 at its rear end 38. An outer collar 54 at the rear end 38 of each nozzle 12 has a forwardly extending flange portion 56 which sits on a circular seat 58 in the mold 16 to locate the rear end 38 of the heated nozzle 12 and provide an insulative air space 60 between the heated nozzle 12 and the surrounding cooled mold 16.

A number of elongated valve pins 62 are received in equally spaced valve pin bores 64 extending in the heated nozzle 12 in alignment with gates 66 leading to cavities 68. The valve pins 62 are simultaneously reciprocated by hydraulic actuating mechanism 70 in the back plate 18. The hydraulic actuating mechanism 70 includes a piston 72 extending through a high pressured seal 74 in a cylinder 76 mounted in the back plate 18. Each elongated valve pin 62 has an enlarged head 78 which is secured to the piston 72 by a removable cap 80. Controlled fluid pressure is applied to the cylinder 76 on opposite sides of the piston 72 through hydraulic lines 82, 84 to simultaneously reciprocate the elongated valve pins 62 between a retracted open position and a forward closed position in which the front end 86 of each elongated valve pin 62 is seated in one of the gates 66.

A melt passage 88 extends from a central inlet 90 in a cylindrical inlet portion 92 of the melt distribution manifold 10 and branches outwardly in the melt distribution manifold 10 to convey melt to the melt bore 50 in each heated nozzle 12. Each heated nozzle 12 has a hole 94 near its front end 96 into which a thermocouple element 98 extends to monitor and control the operating temperature.

As best seen in FIG. 2, each heated nozzle 12 according to the invention has a valve bushing 100 made of tool steel seated in a recessed seat 102 in its front end 96. The valve bushing 100 has three equally spaced valve pin bores 104 extending from its rear end 106 to its front end 108. While the valve pin bushing 100 shown has three valve pin bores 104, it can have more or less in other embodiments. A steel dowel 110 extending between the heated nozzle 12 and the valve bushing 100 ensures the valve bushing 100 is oriented in the recessed seat 102 with each valve pin bore 104 through the valve bushing 100 aligned with one of the valve pin bores 64 through the heated nozzle 12. In this embodiment, each elongated valve pin 62 has a larger diameter portion 112 with a smaller diameter portion 114 extending therefrom to the front end 86. The larger diameter portion 112 of each elongated valve pin 62 fits in one of the valve pin bores 104 to prevent melt leakage as the elongated valve pin 62 reciprocates. Each valve bushing 100 also has a melt bore 116 extending therethrough from its rear end 106 to its front end 108. The melt bore 116 has a number of front portions 118 and a central rear portion 120 extending from the rear end 106 in alignment with the melt bore 50 through the heated nozzle 12. As can be seen, each front portion 118 extends diagonally outward from the central rear portion 120 to join one of the valve bores 104 adjacent the front end 108 of the valve bushing 100.

A retaining ring 122 which fits inside a nozzle seal 124 is also received in the seat 102 in the front end 96 of the heated nozzle 12 with its rear end 126 abutting against the front end 108 of the valve bushing 100. The retaining ring 122 is also made of H13 tool steel and has three equally spaced openings 128 extending therethrough from its rear end 126 to its front end 130. Each opening 128 has an elongated hollow nozzle insert 132 made of a corrosion and wear resistant and heat conductive material such as a tungsten carbide alloy seated therein. Each nozzle insert 132 has an outwardly extending circular shoulder 134 which abuts against a shoulder 136 extending inwardly around the opening 128 to secure the nozzle insert 132 in place with its rear end 138 abutting against the front end 108 of the valve bushing 100 and a front portion 140 extending forwardly from the front end 130 of the retaining ring 122. Another steel dowel 142 extending between the valve bushing 100 and the retaining ring 122 ensures the nozzle inserts 132 are each aligned with one of the valve pin bores 104 through the valve bushing 100 and with one of the gates 66. Each elongated nozzle insert 132 has a central bore 144 extending therethrough from its rear end 138 to its front end 146. The central bore 144 is big enough to receive the smaller diameter portion 114 of the elongated valve pin 62 therethrough with a big enough space 147 extending around the elongated valve pin 62 to convey melt from the diagonal front portion 118 of the melt bore 116 through the valve bushing 100 to the aligned gate 66.

The nozzle seal 124 is also made of H13 tool steel and has a central nut portion 148 and a rear portion 150 with a threaded outer surface 152 which screws into a threaded front portion 154 of the recessed seat 102 in the front end 96 of the heated nozzle 12. The nozzle seal 124 has an inwardly extending circular shoulder 156 that abuts against a shoulder 158 extending around the retaining ring 122 to securely retain the valve bushing 100, the retaining ring 122 and the elongated nozzle inserts 132 in place. The nozzle seal 124 also has a sealing and alignment flange portion 160 that extends forwardly to fit into a matching cylindrical portion 162 of the well 14 in the mold 16 extending around the gates 66. Thus, the nozzle seal 124 accurately aligns the front end 96 of the heated nozzle 12 and bridges the insulative air space 60 around the heated nozzle 12 to prevent melt leakage.

In use, the injection molding system or apparatus is assembled as shown in FIG. 1. Electrical power is applied to the heating element 26 in the melt distribution manifold 10 and the heating elements 44 in the nozzles 12 to heat them to a predetermined operating temperature. Water is pumped through the cooling conduits 28 to cool the mold 16. With hydraulic pressure applied through lines 84 to retract the elongated valve pins 62 to the open position, pressurized melt is applied from a molding machine (not shown) through the central inlet 90 to the melt passage 88. The melt branches in the melt distribution manifold 10 and flows through the melt bores 50 through the heated nozzles 12, through the melt bore 116 through the valve bushings 100, around the valve pins 62 through the bores 144 through the nozzle inserts 132 and through the gates 66 into the cavities 68. After the cavities 68 are full and a short packing period has elapsed, hydraulic pressure is released through line 84 and applied through line 82 to simultaneously drive the elongated valve pins 62 forward to the closed position with their front ends 86 seated in the gates 66. After a short cooling period, the mold 16 is opened along the parting line 164 to eject the molded products. After ejection, the mold 16 is closed and this injection cycle is repeated continuously with a cycle time dependent upon the size of the cavities 66 and the type of material being molded.

While the description of the valve gated injection molding apparatus wherein the melt bore 116 splits in a valve bushing 100 near the front end 96 of each heated nozzle 12 has been given with respect to a preferred embodiment, it will be evident that various other modifications are possible without departing from the scope of the invention as understood by those skilled in the art and as provided in the following claims.

The embodiments of the invention in which an exclusive property or privilege is claimed is defined as follows:

1. In a multi-cavity valve gated injection molding apparatus having at least one heated nozzle (12) extending forwardly into a well (14) in a cooled mold (16) with an insulative air space (60) extending between the at least one heated nozzle (12) and the surrounding cooled mold (16), the at least one heated nozzle (12) having a rear end (38), a front end (96) and a plurality of equally spaced valve pin bores (64) extending therethrough from the rear end (38) to the front end (96), a corresponding plurality of elongated valve pins (62) each received in one of the valve pin bores (64) through the at least one heated nozzle (12), and a valve pin actuating mechanism (70) connected to the valve pins (62) to simultaneously reciprocate the valve pins (62)

between at least an open position and a closed position, the improvement further comprising;

(a) the at least one heated nozzle (12) having a melt bore (50) extending therethrough from a central inlet (52) at the rear end (38), (b) a valve bushing (100) seated in a recessed seat (102) in the front end (96) of the at least one heated nozzle (12), the valve bushing (100) having a rear end (106), a front end (108), a plurality of equally spaced valve pin bores (104) extending therethrough from the rear end (106) to the front end (108) in alignment with the valve pin bores (64) through the at least one heated nozzle (12), and a melt bore (116) extending therethrough from the rear end (106) to the front end (108), the melt bore (116) having a plurality of front portions (118) and central rear portion (120) extending from the rear end (106) in alignment with the melt bore (50) through the at least one heated nozzle (12), each front portion (118) extending from the central rear portion (120) diagonally outwardly to each join one of the valve pin bores (104) adjacent the front end (108) of the valve bushing (100), (c) a retaining ring (122) seated in the recessed seat (102) in the front end (96) of the at least one heated nozzle (12) adjacent the front end (108) of the valve bushing (100), the retaining ring (122) having a rear end (126), a front end (130) and a plurality of openings (128) extending therethrough from the rear end (126) to the front end (130), each opening (128) extending in alignment with one of the valve pin bores (104) through the valve bushing (100), (d) a plurality of elongated hollow nozzle inserts (132), each retainably seated in one of the openings (128) through the retaining ring (122) with a front portion (140) extending forwardly from the retaining ring (122) in alignment with a gate (66) leading to a cavity (68), each nozzle insert (132) having a rear end (138), a front end (146), and a central bore (144) extending therethrough from the rear end (138) to the front end (146) to receive one of the valve pins (62) therein, with a space (147) extending around the valve pin (62) to convey melt from one of the diagonal front portions (118) of the melt bore (116) through the valve bushing (100) to the aligned gate (66), and (e) a nozzle seal (124) removably mounted at the front end (96) of the at least one heated nozzle (12) bridging the insulative air space (60) between the at least one heated nozzle (12) and the cooled mold (16), locating the front end (96) of the at least one nozzle (12), and retaining the valve bushing (100), the retaining ring (122), and the nozzle inserts (132) in place.

2. Injection molding apparatus as claimed in claim 1 wherein the retaining ring (122) has a shoulder (158) and the nozzle seal (124) has a shoulder (156) which abuts against the shoulder (158) of the retaining ring (122) to retain the valve bushing (100), retaining ring (122) and the nozzle inserts (132) in place.

3. Injection molding apparatus as claimed in claim 2 wherein each nozzle insert (132) has a shoulder (134) and each opening (128) extending through the retaining ring (122) has a shoulder (136) which abuts against the shoulder (134) of the nozzle insert (132) extending therethrough to retain the nozzle insert (132) in place.

4. Injection molding apparatus as claimed in claim 3 wherein the nozzle seal (124) has a sealing and alignment flange portion (160) extending forwardly to fit into a matching cylindrical portion (162) of the well (14) in the mold (16) extending around the gates (66) to align the front end (96) of the at least one heated nozzle (12) and prevent leakage of melt into the insulative air space (60) between the at least one heated nozzle (12) and the surrounding cooled mold (16).

5. Injection molding apparatus as claimed in claim 4 wherein the recessed seat (102) in the front end (96) of the at least one heated nozzle (12) has a threaded portion (154) and the nozzle seal (124) has a rear portion (150) with a threaded outer surface (152) which screws into the threaded portion (154) of the recessed seat (102).

6. Injection molding apparatus as claimed in claim 5 wherein there are three valve pins (62), and three aligned valve pin bores (64) extending through the at least one heated nozzle (12), three valve pin bores (104) extending through the valve bushing (100), and three nozzle inserts (132) seated in three openings (128) through the retaining ring (122).

7. Injection molding apparatus as claimed in claim 6 wherein the valve pin actuating mechanism comprises a hydraulically actuated piston (72) in a cylinder (76) seated in the cooled mold (16), the piston (72) being connected to the valve pins (62) received in the valve pin bores (64) through the at least one heated nozzle (12).

* * * * *